(12) United States Patent
Przytulski et al.

(10) Patent No.: US 6,470,666 B1
(45) Date of Patent: Oct. 29, 2002

(54) METHODS AND SYSTEMS FOR PREVENTING GAS TURBINE ENGINE LUBE OIL LEAKAGE

(75) Inventors: James Charles Przytulski, Fairfield, OH (US); Charles Robert Granitz, Cincinnati, OH (US); Frederic Gardner Haaser, Cincinnati, OH (US); Awtar Singh Khera, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/845,447

(22) Filed: Apr. 30, 2001

(51) Int. Cl.⁷ .................................................. F02C 7/06
(52) U.S. Cl. .................... 60/39.08; 60/39.07; 60/39.02; 184/6.11; 184/6.4
(58) Field of Search .............................. 60/39.08, 39.07, 60/39.02; 184/6.23, 6.11, 6.4, 6.12; 415/110, 111, 112; 55/400, 409, 413, 438, 500

(56) References Cited

U.S. PATENT DOCUMENTS

| | | | | |
|---|---|---|---|---|
| 2,571,166 A | * | 10/1951 | Rossetto | 184/6.11 |
| 2,888,097 A | * | 5/1959 | Scheffler, Jr. | 184/6.23 |
| 3,378,104 A | * | 4/1968 | Venable | 184/6.12 |
| 3,722,212 A | * | 3/1973 | Stein | 60/39.08 |
| 3,884,041 A | * | 5/1975 | Zerlauth | 60/39.08 |
| 3,960,121 A | | 6/1976 | Backus | |
| 4,176,651 A | | 12/1979 | Backus | |
| 4,262,775 A | * | 4/1981 | Webb | 184/6.4 |
| 4,284,174 A | * | 8/1981 | Salvana et al. | 60/39.08 |
| 4,433,539 A | * | 2/1984 | Norris et al. | 60/39.08 |
| 4,511,016 A | * | 4/1985 | Doell | 60/39.08 |
| 4,576,001 A | * | 3/1986 | Smith | 60/39.08 |
| 4,891,934 A | | 1/1990 | Huelster | |
| 5,201,845 A | | 4/1993 | Allmon et al. | |
| 5,257,903 A | | 11/1993 | Allmon et al. | |
| 5,319,920 A | * | 6/1994 | Taylor | 60/39.08 |
| 5,429,208 A | * | 7/1995 | Largillier et al. | 60/39.08 |
| 5,611,661 A | * | 3/1997 | Jenkinson | 60/39.08 |

* cited by examiner

Primary Examiner—Thomas Denion
Assistant Examiner—Thai-Ba Trieu
(74) Attorney, Agent, or Firm—William Scott Andes; Armstrong Teasdale LLP

(57) ABSTRACT

A sump evacuation system for a gas turbine facilitates reducing oil leakage from bearing assembly sumps in a cost-effective and reliable manner. The engine includes at least one bearing assembly housed within a sump pressurization cavity. The sump evacuation system includes a sump pressurization cavity, a sump oil cavity, an air/oil separator, and an air pump. The bearing assembly and the sump oil cavity are coupled in flow communication with the sump pressurization cavity, and the air/oil separator is coupled in flow communication with the sump oil cavity. Furthermore, the air pump is coupled in flow communication with the air/oil separator.

19 Claims, 3 Drawing Sheets

METHODS AND SYSTEMS FOR PREVENTING GAS TURBINE ENGINE LUBE OIL LEAKAGE

BACKGROUND OF THE INVENTION

This invention relates generally to gas turbine engines, and more specifically to sump evacuation systems used with gas turbine engine engines.

A gas turbine engine typically includes at least one bearing assembly that rotatably supports a shaft. The bearing assembly is lubricated with oil, and heat from other engine components is absorbed and dissipated by the same oil. Accordingly, bearing assemblies are housed within sumps that include a supply pump that supplies lubricating oil under pressure to the bearing assemblies, and a scavenge pump that removes lubricating oil from the sump. The scavenge pump causes the return oil to pass through a heat exchanger prior to returning the oil to a tank or reservoir. The bearing assembly sumps also include seal assemblies that facilitate minimizing oil leakage from the sumps along the rotor shaft.

To further facilitate reducing oil from leaking from the bearing assembly sumps, at least some known bearing assembly sumps are also housed within pressurized cavities. The cavities include seal labyrinths that extend around the rotor shaft. During operation, compressed air is supplied to each surrounding pressurized cavity to maintain a positive pressure around the bearing assembly sump. Thus, oil leakage from the bearing assembly sump having the lower operating pressure to the pressurized cavity having the higher operating pressure is facilitated to be reduced.

However, during some engine operating conditions, the pressurization of the air supplied to the pressurized cavity may be insufficient to prevent the oil from leaking from the bearing assembly sump or seals. Moreover, because such leakage may be excessive, identifying a source of such leakage, and repairing the engine to prevent future leakage, may be a time-consuming and costly process.

BRIEF SUMMARY OF THE INVENTION

In an exemplary embodiment, a sump evacuation system for a gas turbine facilitates reducing oil leakage from bearing assembly sumps in a cost-effective and reliable manner. The engine includes at least one bearing assembly. The sump evacuation system includes a sump pressurization cavity, a sump oil cavity, and an air pump. The bearing assembly is housed within the sump oil cavity and is coupled in flow communication with the sump pressurization cavity. The air pump is coupled in flow communication with the sump oil cavity.

During low-power or idle engine operations, the sump evacuation system is activated to facilitate preventing oil from inadvertently leaking from the sump oil cavity. More specifically, the sump evacuation system air pump draws air from the sump oil cavity, such that an operating pressure within the sump oil cavity is reduced below that of an operating pressure within the sump pressurization cavity. As a result, the oil is prevented from leaking from the lower pressure sump oil cavity during low-power or idle engine operations in a cost-effective and reliable manner.

DETAILED DESCRIPTION OF THE INVENTION

Figure 1:
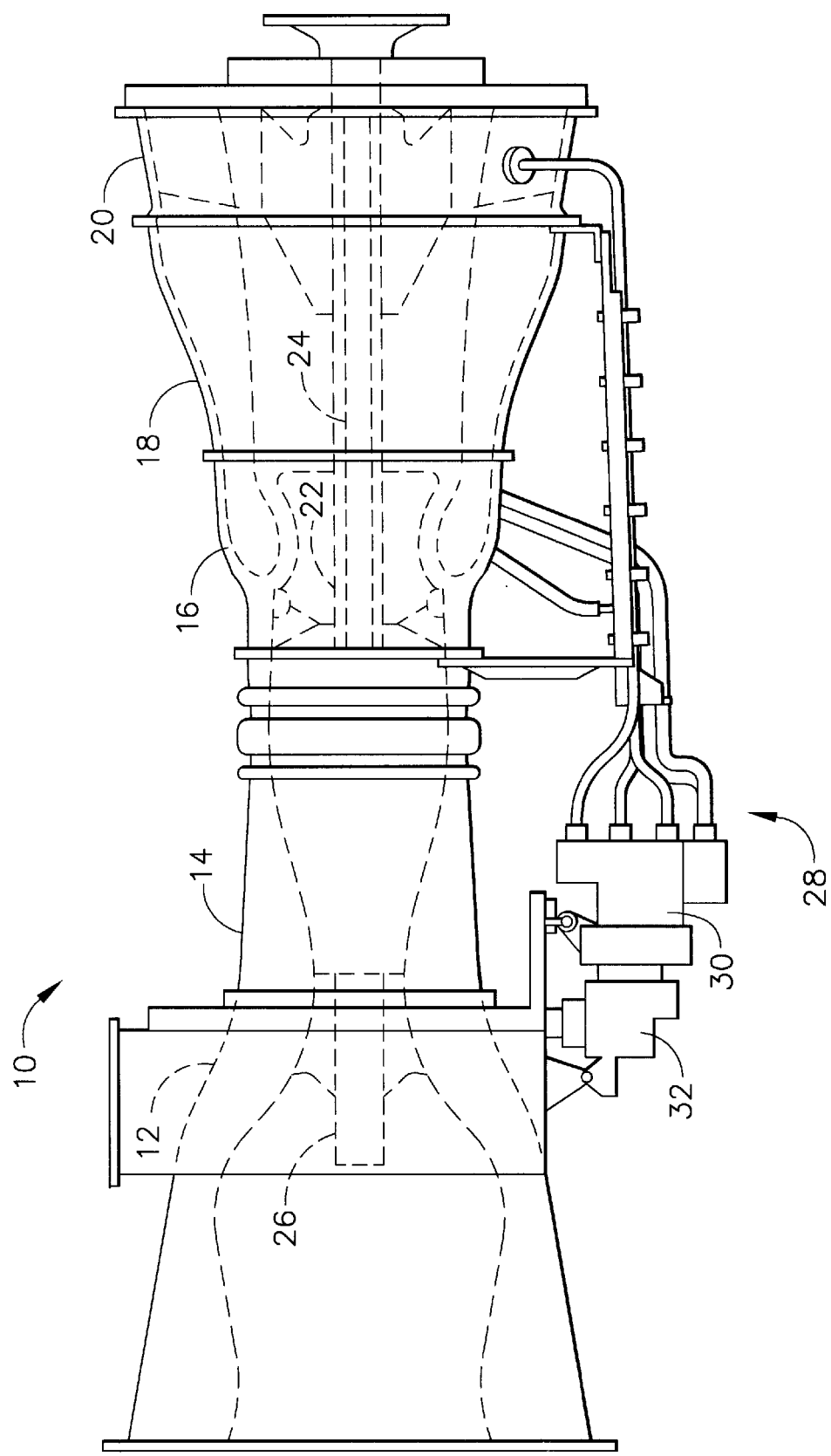
FIG. 1 is schematic illustration of a gas turbine engine including an engine lubrication system.

FIG. 1 is a schematic illustration of a gas turbine engine 10 including a low pressure compressor 12, a high pressure compressor 14, and a combustor 16. Engine 10 also includes a high pressure turbine 18 and a low pressure turbine 20. Compressor 12 and turbine 20 are coupled by a first shaft 22, and compressor 14 and turbine 18 are coupled by a second shaft 24. In one embodiment, engine 10 is an LM2500 or LM2500+ engine commercially available from General Electric Company, Cincinnati, Ohio.

Engine 10 also includes a plurality of bearing assemblies 26 that rotatably support shafts 22 and 24. Each bearing assembly 26 is coupled in flow communication to a lubrication system 28 that supplies oil to each bearing assembly 26 for cooling and lubricating each bearing assembly 26. Lubrication system 28 is known in the art and includes supply and scavenge pump assembly 30 that is driven by an accessory drive or gear box 32, as is known in the art. More specifically, a supply portion (not shown in FIG. 1) of assembly 30 provides oil from a supply source (not shown) under pressure to sumps (not shown in FIG. 1) of bearing assemblies 26 to cool and lubricate each bearing (not shown in FIG. 1). A scavenge portion (not shown in FIG. 1) of assembly 30 withdraws lubricating oil from the bearing assembly sumps and returns the oil to the supply source via a heat exchange device (not shown).

During engine operation, air flows through low pressure compressor 12 and compressed air is supplied from low pressure compressor 12 to high pressure compressor 14. The highly compressed air is delivered to combustor 16. Airflow (not shown in FIG. 1) from combustor 16 drives turbines 18 and 20 and exits gas turbine engine 10 through a nozzle 36.

Figure 2:
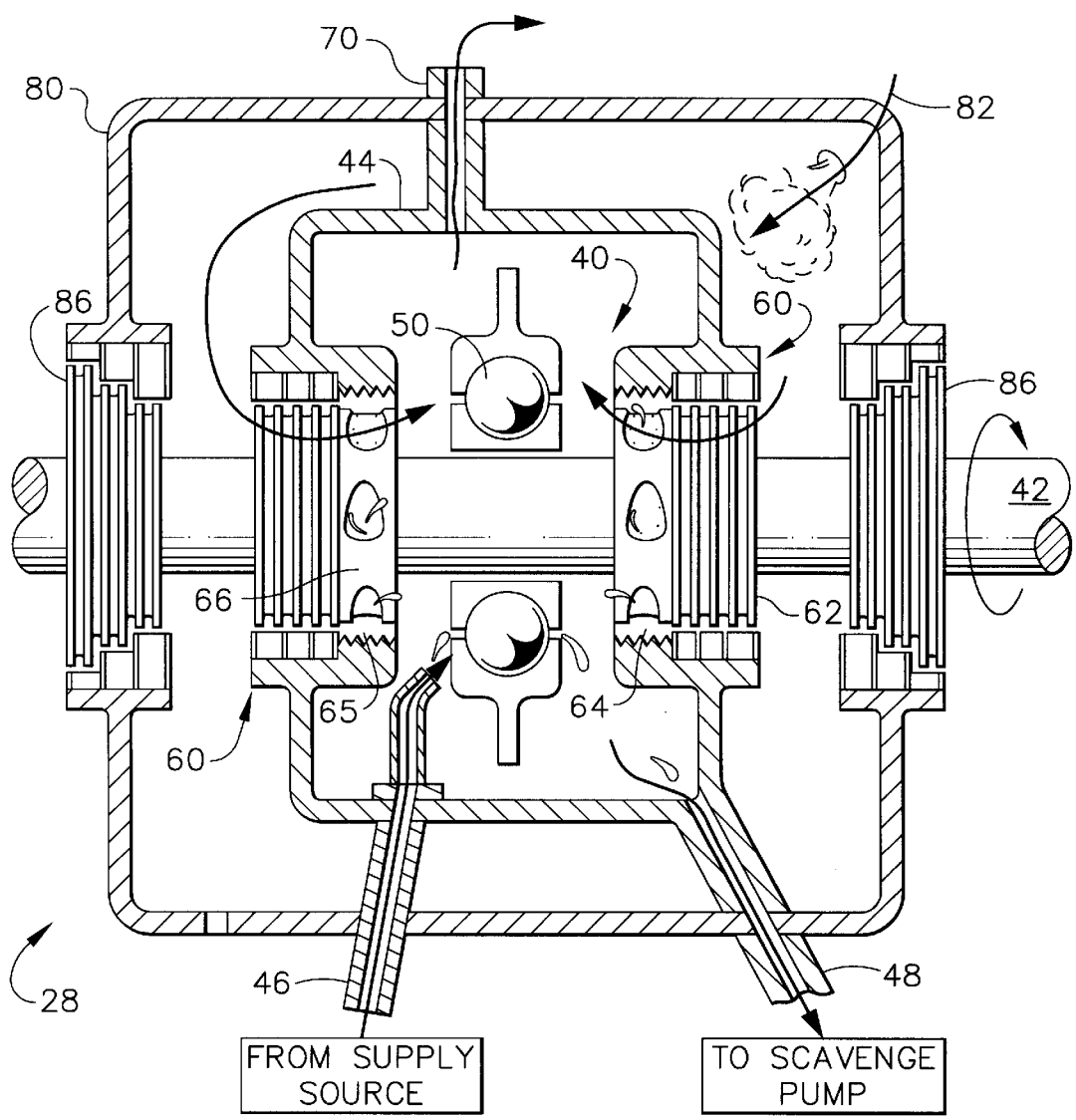
FIG. 2 is a schematic illustration of a known lubrication system that may be used with the gas turbine engine shown in FIG. 1.

FIG. 2 is a schematic illustration of lubrication system 28, including a bearing assembly 40 that rotatably supports a rotor shaft 42. In one embodiment, rotor shaft 42 is similar to rotor shaft 22 shown in FIG. 1. In another embodiment, rotor shaft 42 is similar to rotor shaft 24 shown in FIG. 1. Bearing assembly 40 is housed within a sump oil cavity 44, and is in flow communication with lubrication system supply and scavenge portions 46 and 48, respectively. More specifically, lubrication system supply portion 46 provides oil from a supply source (not shown) under pressure to sump oil cavity 44 to cool and lubricate each bearing assembly bearing 50. Furthermore, lubrication system scavenge portion 48 withdraws lubricating oil from sump oil cavity 44 and returns the oil to the supply source.

In the exemplary embodiment, sump oil cavity 44 includes a plurality of seal assemblies 60 to facilitate oil supplied under pressure from lubrication system supply portion 46 from inadvertently leaking from cavity 44 along shaft 42. Each seal assembly 60 includes an air seal portion 62 and an oil seal portion 64. Oil seal portion 64 is coupled within each seal assembly 60 with a plurality of windback threads 65. Furthermore, each oil seal portion 64 includes an oil slinger 66, such that oil entering each seal assembly 60 along rotor shaft 42 is returned into sump oil cavity 44 when shaft 42 is rotating. Sump oil cavity 44 also includes a sump vent 70 that is coupled to a sump evacuation system (not shown in FIG. 2).

Sump oil cavity 44 is encased within a sump pressurization cavity 80. Sump pressurization cavity 80 is in flow communication with an air source and receives compressed air 82 for pressurizing sump pressurization cavity 80. In one embodiment, compressed air 82 is supplied from high pressure compressor 14. Sump pressurization cavity 80 includes a plurality of air seal assemblies 86 to facilitate compressed air 82 supplied to sump pressurization cavity 80 from inadvertently escaping sump pressurization cavity 80 along shaft 42. In one embodiment, seal assemblies 86 are known as seal labyrinth seals. Sump oil cavity sump vent 70 extends through sump pressurization cavity 80.

Figure 3:
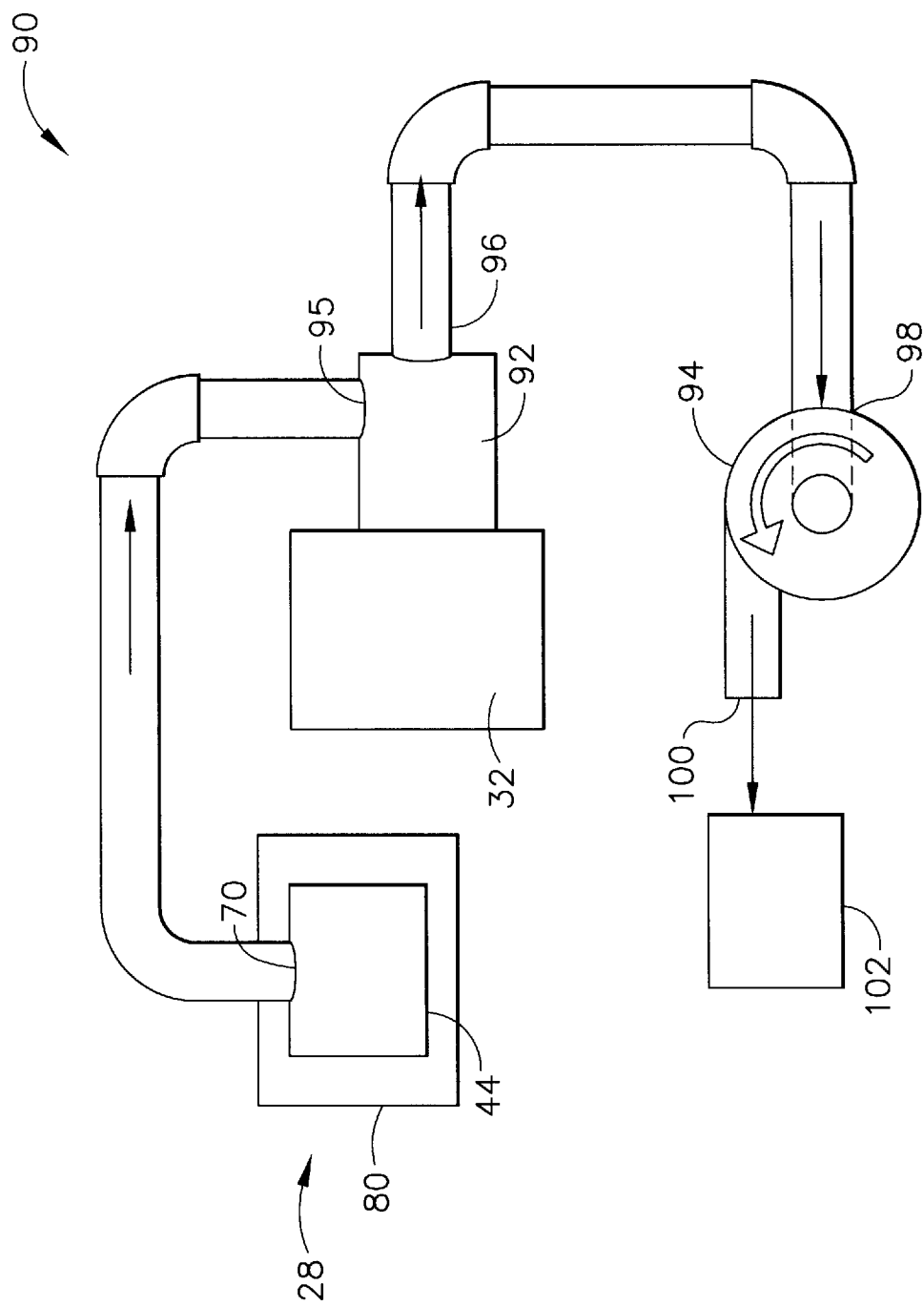
FIG. 3 is a schematic illustration of a sump evacuation system used with the lubrication system shown in FIG. 2.

FIG. 3 is a schematic illustration of a sump evacuation system 90 used with lubrication system 28. In the exemplary embodiment, sump evacuation system 90 includes an air/oil separator 92 and an air pump 94. Air/oil separator 92 is known in the art and is driven by accessory drive or gear box 32, as is known in the art. More specifically, air/oil separator 92 includes an inlet 94 and an exhaust 96. In an alternative embodiment, sump evacuation system 90 does not include air/oil separator 92. Separator inlet 95 is coupled to sump oil cavity sump vent 70, and is know in the art, separates air exiting sump oil cavity 44 from oil that may have been carried along with the air.

Separator exhaust 96 is coupled to air pump 94. More specifically, air pump 94 is downstream from air/oil separator 92 and includes an intake 98 and an exhaust 100. Air pump intake 98 is coupled in flow communication with air/oil separator exhaust 96, and air pump exhaust 100 is coupled in flow communication with a known engine exhaust and vent system 102 that discharges exhaust from engine 10. In an alternative embodiment, air pump exhaust 100 is not coupled to vent system 102, but is instead coupled in flow communication with a known off-engine static air/oil separator. Sump evacuation system air pump 94 is electrically coupled to an engine control system (not shown) that controls operation of air pump 94 and sump evacuation system 90.

During normal engine operation, oil and compressed air 82 are supplied to sump oil cavity 44, and engine pressures are sufficient to facilitate reducing inadvertent oil leakage from sump oil cavity 44. More specifically, during normal engine operation, compressed air 82 raises an operating pressure within sump pressurization cavity 80 to be above that of an operating pressure within sump oil cavity 44. Accordingly, compressed air 82 is forced into sump oil cavity 44 through sump oil cavity seal assemblies 60, thus preventing oil from inadvertently leaking from sump oil cavity 44 through seal assemblies 60.

However, during engine low-power or idle operations, engine pressures may not be sufficient to facilitate preventing oil from inadvertently leaking from sump oil cavity 44 through seal assemblies 60. During such operating conditions, the engine controller activates sump evacuation system 90 to facilitate preventing oil from inadvertently leaking from sump oil cavity 44. More specifically, operation of sump evacuation system air pump 94 draws air from sump oil cavity 44 through air/oil separator 92, such that an operating pressure within sump oil cavity 44 is reduced below that of an operating pressure within sump pressurization cavity 80. As a result, compressed air 82 supplied to sump pressurization cavity 80 has an operating pressure that is greater than that of the oil within sump oil cavity 44, and the oil is prevented from leaking through sump oil cavity seal assemblies 60.

The above-described sump evacuation system is cost-effective and highly reliable. The sump evacuation system includes an air pump that is coupled to the air/oil separator which in-turn is coupled to the sump oil cavity sump vent. The sump evacuation system is electrically coupled to an engine control system such that the evacuation system is activated during low-power and idle engine operating conditions. During such engine operating conditions, the air pump reduces an operating pressure within the bearing assembly sump cavity such that oil leakage from the cavity is facilitated to be prevented in a cost-effective and reliable manner.

While the invention has been described in terms of various specific embodiments, those skilled in the art will recognize that the invention can be practiced with modification within the spirit and scope of the claims.

What is claimed is:

1. A method for operating a gas turbine engine to facilitate reducing engine lubrication system leakage, the engine including at least one bearing assembly and a sump evacuation system including a sump oil cavity, a sump pressurization cavity, and an air pump, the bearing assembly within the sump pressurization cavity, the air pump in flow communication with the sump oil cavity, said method comprising the steps of:

supplying sump pressurization air to the sump pressurization cavity;

venting the sump oil cavity; and reducing the operating pressure of the sump oil cavity in comparison to the operating pressure of the sump pressurization cavity during engine low-power and idle operations.

2. The method in accordance with claim 1 wherein said step of reducing the operating pressure of the sump oil cavity further comprises operating the air pump to reduce the operating pressure of the sump oil cavity relative to the sump pressurization cavity.

3. The method in accordance with claim 1 wherein the sump evacuation system includes an air/oil separator, said step of reducing the operating pressure of the sump oil cavity further comprises the steps of:

coupling the air pump downstream from the air/oil separator; and operating the air pump to reduce the operating pressure of the sump oil cavity relative to the sump pressurization cavity.

4. The method in accordance with claim 3 wherein said step operating the air pump further comprises the step of operating the air pump during engine low-power and idle operations to reduce the operating pressure of the sump oil cavity relative to the sump pressurization cavity.

5. The method in accordance with claim 3 wherein the engine includes an accessory gear box, said step of operating the air pump further comprises the step of coupling the air pump to the engine accessory gear box.

6. The method in accordance with claim 1 further comprising the steps of returning the oil to a supply with a scavenge pump.

7. A sump evacuation system for a gas turbine engine, said sump evacuation system comprising:

a sump pressurization cavity;

a sump oil cavity in flow communication with said sump pressurization cavity; and an air pump in flow communication with said sump oil cavity, said air pump configured to induce a vacuum within said sump oil cavity relative to said sump pressurization cavity.

8. The sump evacuation system in accordance with claim 6 further comprising an said air/oil separator coupled to an engine accessory gear box, such that said air/oil separator in flow communication with said air pump.

9. The sump evacuation system in accordance with claim 6 wherein said sump oil cavity within said sump pressurization cavity.

10. The sump evacuation system in accordance with claim 6 wherein said air pump down stream from said sump oil cavity.

11. The sump evacuation system in accordance with claim 6 further comprising an air/oil separator in flow communication with said air pump, said air pump downstream from said separator, said air/oil separator downstream from said sump oil cavity.

12. The sump evacuation system in accordance with claim 6 wherein the engine includes an exhaust system, said air pump in flow communication with the engine exhaust system.

13. The sump evacuation system in accordance with claim 7 further comprising a scavenge pump in flow communication with said sump oil cavity.

14. A gas turbine engine comprising:

at least one bearing assembly; and a sump evacuation system configured to supply lubrication to said bearing assembly, said sump evacuation system comprising a sump pressurization cavity, a sump oil cavity, and an air pump, said bearing assembly and said sump oil cavity in flow communication with said sump pressurization cavity, said air/oil separator in flow communication with said sump oil cavity, said air pump configured to reduce an operating pressure of said sump oil cavity relative to said to said sump pressurization cavity.

15. The gas turbine engine in accordance with claim 14 wherein said sump evacuation system air pump downstream from said sump oil cavity.

16. The gas turbine engine in accordance with claim 15 wherein said sump evacuation system further comprises an air/oil separator coupled upstream from said sump evacuation system air pump.

17. The gas turbine engine in accordance with claim 15 further comprising an engine accessory gear box, said sump evacuation system air/oil separator coupled to said engine accessory gear box.

18. The gas turbine engine in accordance with claim 15 further comprising an engine exhaust system, said sump evacuation system air pump in flow communication with said engine exhaust system.

19. The gas turbine engine in accordance with claim 14 wherein said sump evacuation system further comprises a scavenge pump in flow communication with said sump oil cavity.

* * * * *

UNITED STATES PATENT AND TRADEMARK OFFICE
CERTIFICATE OF CORRECTION

PATENT NO. : 6,470,666 B1
DATED : October 29, 2002
INVENTOR(S) : Przytulski et al.

It is certified that error appears in the above-identified patent and that said Letters Patent is hereby corrected as shown below:

Column 4,
Line 65, delete "cavity." and insert therefor -- cavity during engine low-power and idle operations. --.
Line 67, delete "6 further" and insert therefor -- 7 further --.
Line 67, delete "an said" and insert therefor -- an --.

Column 5,
Lines 4, 7 and 15, delete "6 wherein" and insert -- 7 wherein --.
Line 10, delete "6 further" and insert therefor -- 7 further --.
Line 12, between "said" and "separator" insert -- air/oil --.

Column 6,
Line 4, delete "to said to said" and insert therefor -- to said --.
Line 5, delete "cavity." and insert therefor -- cavity during engine low-power and idle operations. --.

Signed and Sealed this

Fifth Day of April, 2005

JON W. DUDAS
*Director of the United States Patent and Trademark Office*